March 26, 1968 P. F. HAYNER ETAL 3,375,386
PRINTED CIRCUIT MOTOR
Filed April 26, 1965 2 Sheets-Sheet 1
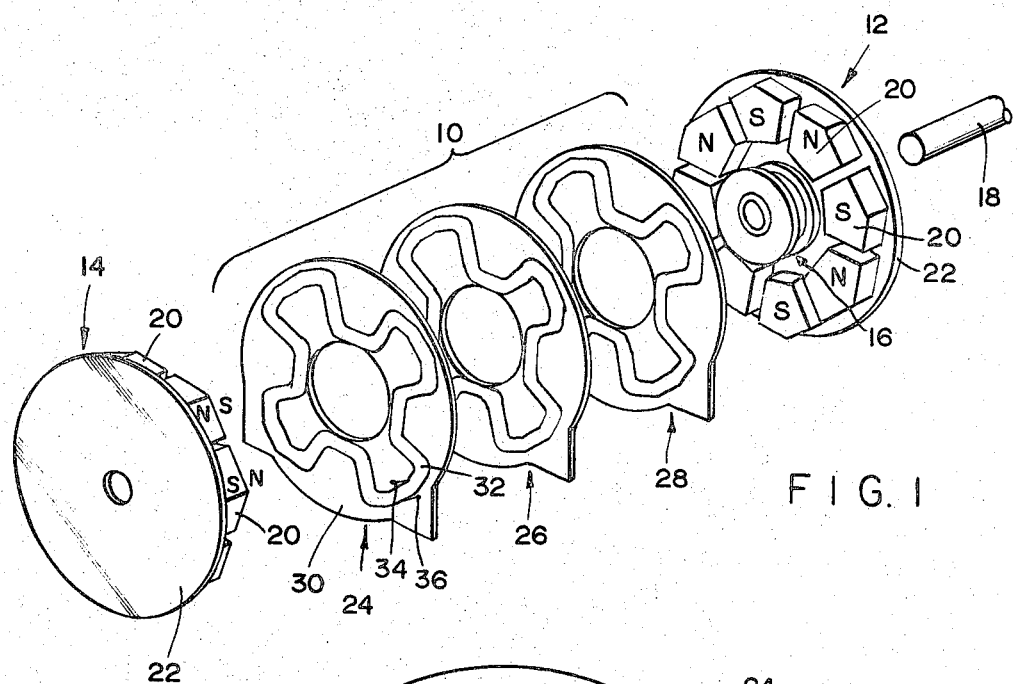
FIG. 1
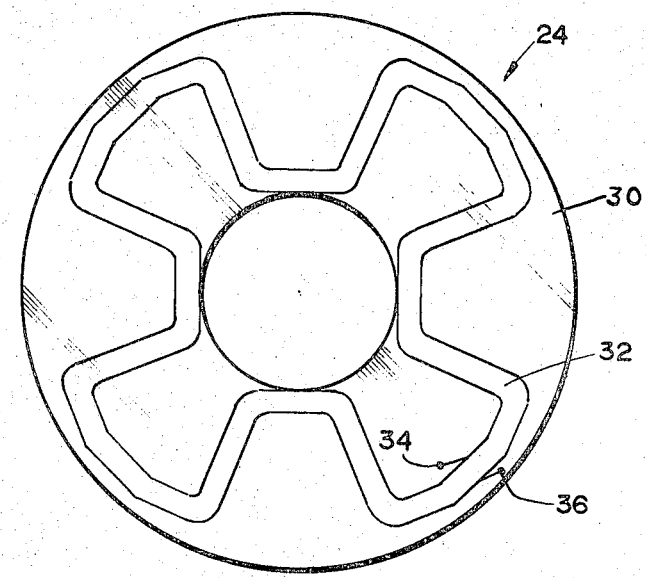
FIG. 2
INVENTORS
PAUL F. HAYNER
GERALD L. BERNIER
BY
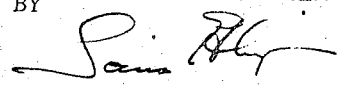
ATTORNEY

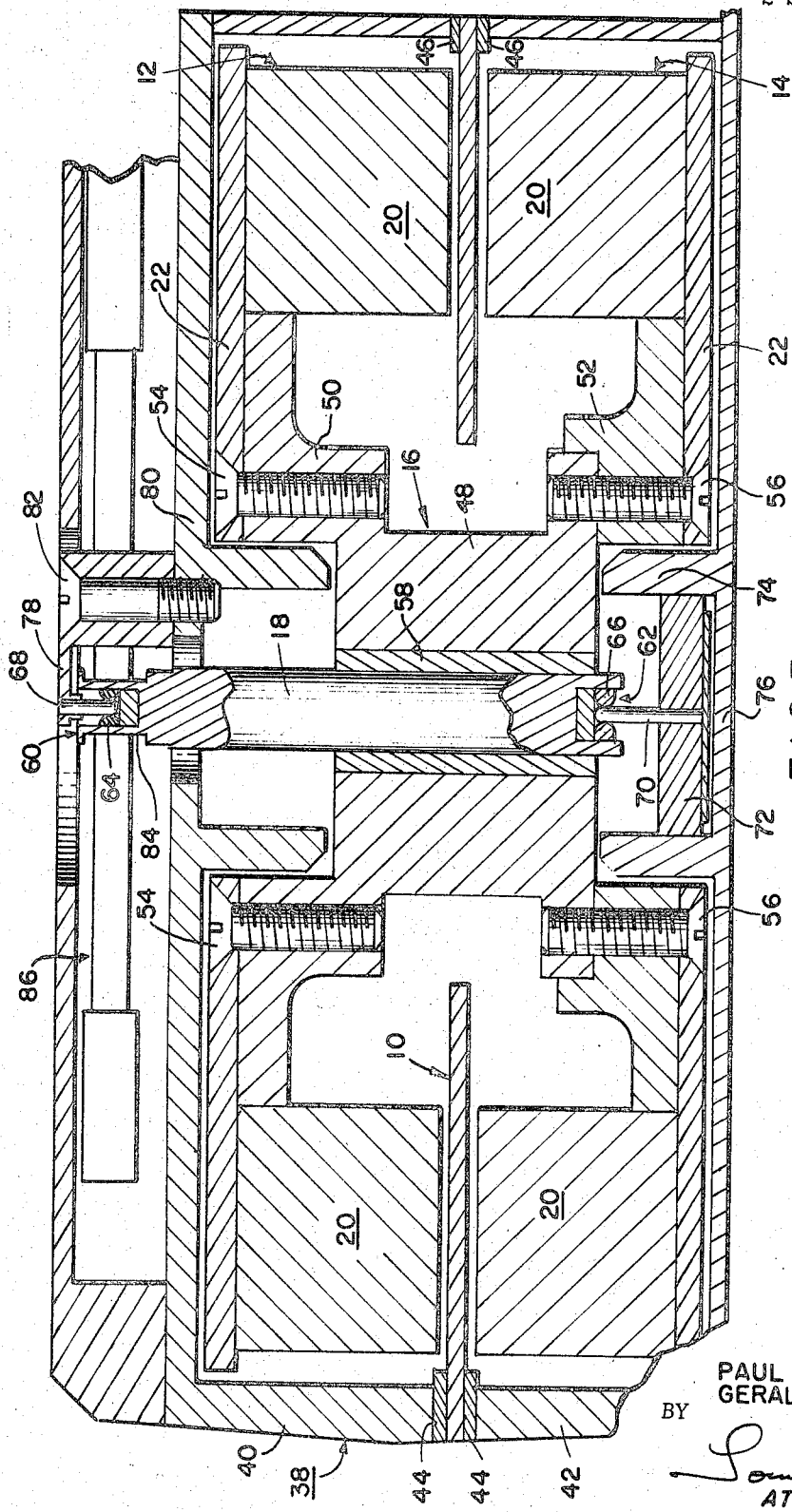

United States Patent Office 3,375,386
Patented Mar. 26, 1968

3,375,386
PRINTED CIRCUIT MOTOR
Paul F. Hayner, Lexington, Mass., and Gerald L. Bernier, Nashua, N.H., assignors to Sanders Associates, Inc., Nashua, N.H., a corporation of Delaware
Filed Apr. 26, 1965, Ser. No. 450,843
10 Claims. (Cl. 310—268)

ABSTRACT OF THE DISCLOSURE

This invention pertains to a brushless alternating-current motor with a rotating field and having printed circuit disks for a stationary armature. The apparatus disclosed is a motor that is driven by a variable frequency source to control the speed thereof. The magnetic field is developed axially by permanent magnets of opposite polarity that are mounted for rotation together on an axis and spaced apart in the direction of the axis to provide a gap of substantially constant magnetic flux. The printed circuit armature is axially disposed within the gap.

---

This invention relates to a compact, brushless alternating-current motor construction especially suitable for low power applications such as magnetic tape drive mechanisms. More specifically, it relates to a synchronous motor of the stationary armature type having an axially directed magnetic field developed by a rotating field assembly comprising field magnets at opposite ends of the motor. The armature, which preferably takes the form of a plurality of printed circuit disks, is disposed between the field magnets.

The drive mechanism used in magnetic tape recorders is illustrative of a number of applications where it is often desired to use an electric motor having constant speed and high inertia, combined with the somewhat antithetical characteristics of compactness and relatively low overall weight. More specifically, long-term constancy of speed can easily be obtained by using a synchronous motor connected to a power supply having a relatively stable frequency. Short-term variations due, for example, to abrupt changes in the load imposed on the motor are minimized by providing the motor with a relatively high inertia compared to the magnitude of the load variations. In fact, a fly wheel is sometimes added to the motor for this purpose.

On the other hand, it is often desirable that the assembly incorporating the motor be a compact, light-weight unit, particularly when mobile or airborne applications are contemplated. The use of a massive motor to stabilize speed runs contrary to both these desired characteristics.

Another problem source in small motors has been the frictional drag of the brushes which convey power to the rotating armature. The drag adversely affects efficiency, and also contributes to instability of speed.

Accordingly, it is a principal object of the present invention to provide an electric motor suitable for use in a magnetic tape drive mechanism and other devices requiring similar motor characteristics.

A more specific object of the invention is the provision of an electric motor having a relatively low power output and characterized by relatively high efficiency, high inertia, low weight and compact size.

Another object of the invention is to provide a motor of the above type capable of relatively stable speed.

A further object of the invention is to provide a motor of the above type having a relatively low cost construction.

Yet another object of the invention is to provide a tape drive mechanism incorporating a motor of the above type.

Other objects of the invention will in part be obvious and will in part appear hereinafter.

The invention accordingly comprises the features of construction, combination of elements, and arrangements of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which:

FIG. 1 is an exploded view of a motor embodying the invention,

FIG. 2 is an enlarged view of one of the armature cards used in the motor,

FIG. 3 is a longitudinal section of the motor illustrating its use in a magnetic tape drive, and FIG. 4 is a schematic diagram of an electric circuit including the motor.

The present invention resides primarily in a unique stationary armature-rotating field motor construction. The rotating field magnets, which are also the motor pole pieces, are disposed at opposite ends of the motor. The field orientation is thus parallel to the motor axis, as opposed to the radial direction found in most conventional motors. The armature winding is preferably formed, by means of printed circuit techniques, in several layers bonded to thin substrates.

With a stationary armature, there is no need for brushes, thereby eliminating the various problems attendant on their use. Moreover, the entire armature, i.e., the stationary part of the motor, is therefore quite thin, thereby avoiding the need for iron in this component with a resulant low armature weight. The heavy portions of the unit are thus all associated with the rotating field magnets and the ratio of inertia to total motor mass is therefore very large. Accordingly, the motor is characterized by not only the stability of speed resulting from low friction and high inertia, but also a compactness which will be evident in a more detailed description of the invention.

More specifically, as shown in FIG. 1, the motor includes an armature assembly generally indicated at 10 disposed between field units 12 and 14. The field units are secured to a hub assembly 16 which is mounted for rotation on a shaft 18.

Each of the field units 12 and 14 comprises a plurality of pole pieces 20 projecting from a plate 22 of a suitable low reluctance or high permeability magnetic material such as iron. In the preferred embodiment of the motor the pole pieces, which extend inwardly, parallel to the motor axis, are permanent magnets and thus they provide the fixed field of the motor. As indicated in the drawing, the corresponding pole pieces of the field units 12 and 14 are polarized in the same direction.

The armature assembly 10 comprises armature cards 24, 26, and 28 on which armature windings are formed by means of etched circuit techniques. Specifically, as best seen in FIG. 2, each card comprises a substrate 30 with a sheet of copper foil (not shown) originally bonded thereto. The foil is etched away to form a winding 32 whose shape and width correspond to the spaces surrounding the individual pole pieces 20. On the card 24, the winding 32 comprises a conductor which begins at a terminal 34 and then proceeds around the card in zig-zag fashion for a plurality of complete revolutions until it finally terminates at a terminal 36. The windings 32 are connected in series, remembering to make the connections in such manner that the armature current travels around all of them in the same direction.

The details of an assembled motor are shown in FIG.

3. The motor is contained within a housing, generally indicated at 38, having upper and lower sections 40 and 42. Two pairs of brackets 44 and 46, clamped between the housing sections 40 and 42, extend inwardly and in turn clamp the armature assembly 10 in place between the field units 12 and 14 of the motor.

Still referring to FIG. 3, the hub assembly 16 comprises a central hub 48 and end flanges 50 and 52. The flange 50 is integral with the hub 48, while the flange 52 is removable therefrom to facilitate assembly and disassembly of the motor. The field unit 12 is secured to the flange 50 by means of screws 54 extending through the end plate 22 of the field unit. Similarly, screws 56, passing through the end plate 22 of the field unit 14, hold the unit 14 in place and at the same time secure the flange 52 to the hub 48. The hub 48 is press fitted on the shaft 18 by way of an intervening sleeve 58 and the shaft 18, in turn, is mounted for rotation on jewel bearing units 60 and 62.

More specifically, the shaft 18 is bored at its ends to accommodate jewels 64 and 66 interfitting with pins 68 and 70. The lower pin 70 is mounted in a disk 72 retained within a cup 74, which is integral with the bottom plate 76 of the lower housing section 42. The upper bearing pin 68 is mounted in an angle bracket 78, which is secured to the top plate 80 of the upper housing section 40 by means of a screw 82. It will be observed that the screw 82 and bracket 78 hold in place the rotating assembly comprising the field units 12 and 14, the hub assembly 16 and shaft 18 for rotation about the axis of the shaft. The shaft is reduced in diameter, as indicated at 84, to serve as a capstan in a conventionally driven magnetic tape recorder, whose tape and reels are indicated generally at 86.

As also shown in FIG. 3, the separation between the opposing pole pieces 20 of the field units 12 and 14 is made as small as possible, by minimizing the thickness of the armature assembly 10 as well as the spaces between the armature assembly and the pole pieces, in order to maintain the leakage flux at a low level.

With the armature winding configuration illustrated in FIGS. 1 and 2, the motor is arranged for single-phase synchronous operation. It therefore does not have the rotating field associated with polyphase excitation and consequently, there is a virtual absence of starting torque if the current initially supplied to the armature winding has a frequency corresponding to the desired operating speed of the motor. Accordingly, it is preferable to power the motor from a variable frequency source. The source is set to a low frequency and the motor is given an initial start, either manually or by means of a spring loaded mechanism (not shown). It then assumes synchronism with the source, whose frequency is subsequently increased to the operating value, with a corresponding increase in the speed of the motor. An arrangement of this type is shown in FIG. 4, wherein a motor 88 of the type illustrated in FIGS. 1 and 3 is powered by a variable frequency source 90.

The increase in frequency of the source 90 may be accomplished automatically by use of a feedback winding similar to the armature windings. For example, the winding 32 on the card 28 might be used to supply the source 90 with a feedback signal whose frequency corresponds to the speed of rotation of the field units 12 and 14. The source 90 would then process this signal to provide the driving current for the armature windings on the cards 24 and 26 in such manner as to slightly increase the motor speed. The resulting closed-loop operation would rapidly bring the motor up to operating speed. A system of this type is described in the copending application of Paul F. Hayner et al. entitled "Synchronous Motor System" bearing Ser. No. 450,979 filed Apr. 26, 1965.

Thus, we have described a brushless, synchronous motor having high efficiency and a high ratio of inertia to total mass, and therefore characterised by a relatively high stability of speed under transient load variations for a motor of its size. This is accomplished by rotating the relatively heavy field structure and using a stationary armature assembly having a compact, light weight construction. Moreover, the axial field arrangement described above materially aids in achieving a compactness desirable in various portable applications, and the specific design illustrated herein facilitates the manufacture and assembly of the parts comprising the motor. Also not to be overlooked is the fact that with synchronous operation, the motor can run efficiently and provide relatively high torque at low speeds, thereby in many cases eliminating the speed reducing mechanisms often required with small motors.

We have also described a tape drive system incorporating a motor of the above type.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

We claim:
1. An electric motor comprising:
first and second field units
mounted for rotation together on an axis,
spaced apart in the direction of said axis to provide a gap,
arranged to project a substantially constant magnetic field across said gap,
a brushless armature assembly
disposed in said gap,
secured against rotation with said field units,
including at least one winding
comprising a generally spiral wound conductor and
having a configuration providing interaction with said magnetic field when current is passed through said conductor, thereby causing rotation of said field units.

2. The combination defined in claim 1 in which said winding comprises a conductor of metallic foil bonded to the surface of a disk-like substrate.

3. The combination defined in claim 1 including a plurality of said windings connected in series.

4. An electric motor comprising:
a shaft mounted for rotation about an axis,
first and second field units mounted for rotation with said shaft,
each field unit having
a supporting member,
a plurality of pole pieces
projecting from said supporting member along said axis,
with each pole piece facing a pole piece of the other field unit,
each pair of facing pole pieces
being spaced apart along said axis to form a gap, and
projecting a magnetic field of substantially constant intensity across said gap,
a brushless armature assembly
disposed in said gap,
secured against rotation with said field units,
said armature assembly comprising
disk-like substrate disposed transverse to said axis,
a foil-like winding bonded to said substrate, and
having a generally spiral configuration,
said winding defining a tortuous path corresponding to spaces around and between said pole pieces.

5. The combination defined in claim 4 including a plurality of said armature windings connected in series.

6. A motor comprising:
a housing,
bearings supported by said housing,
a shaft supported by said bearings for rotation
on an axis, and
within said housing,
a hub
mounted on said shaft for rotation therewith, and
comprising a pair of radially extending flanges at the ends of a central tubular portion,
first and second field units, each of said field units comprising
a plate secured to one of said flanges,
a plurality of field magnets,
projecting from said plate toward the other field unit,
disposed on a circle concentric with said axis,
having surfaces facing opposing surfaces on field magnets of the other field unit, thereby defining a gap between said field units,
said field units projecting a substantially constant magnetic field across said gap, with the direction of said field between each pair of opposing magnet surfaces being opposite to the direction between the pairs adjacent thereto,
a brushless armature assembly
disposed in said gap,
secured to said housing to prevent rotation with said field units,
said armature assembly comprising
at least one disk-like substrate substantially perpendicular to said axis,
a foil-like conductor bonded to said substrate and having a multiple-turn, spiral-wound configuration,
each turn of said conductor following a tortuous path corresponding to the spaces between and around said field magnets in each of said field units, whereby each turn of said conductor provides a partial turn corresponding to each pair of opposing field magnets, with the sense of successive partial turns being in opposite directions.

7. The combination defined in claim 6 in which said armature assembly includes a plurality of said windings connected in series with each other.

8. In a tape drive system of the type including a tape, feed and take-up means for said tape, and a motor for moving said tape between said feed and take-up means, the improvement in which said motor comprises:
first and second field units
mounted for rotation together on an axis,
spaced apart in the direction of said axis to provide a gap,
arranged to project a substantially constant magnetic field across said gap,
a brushless armature assembly
disposed in said gap,
secured against rotation with said field units,
including at least one winding
comprising a generally spiral wound conductor, and
having a configuration providing interaction with said magnetic field when current is passed through said conductor, thereby causing rotation of said field units.

9. In a tape drive system of the type including a tape, feed and take-up means for said tape, and a motor for moving said tape between said feed and take-up means, the improvement in which said motor comprises:
a shaft mounted for rotation about an axis,
first and second field units mounted for rotation with said shaft,
each field unit having
a supporting member,
a plurality of pole pieces
projecting from said supporting member along said axis,
witn each pole piece facing a pole piece of the other field unit,
each pair of facing pole pieces
being spaced apart along said axis to form a gap, and
projecting a magnetic field of substantially constant intensity across said gap,
a brushless armature assembly
disposed in said gap,
secured against rotation with said field units,
said armature assembly comprising
a disk-like substrate disposed transverse to said axis,
a foil-like winding
bonded to said substrate, and
having a generally spiral configuration,
said winding defining a tortuous path corresponding to spaces around and between said pole pieces.

10. The combination defined in claim 9 in which said shaft includes a pulley portion, and said tape bears against said pulley portion so as to be directly driven by said motor.

References Cited
UNITED STATES PATENTS

| | | | |
|---|---|---|---|
| 447,921 | 3/1891 | Tesla | 310—268 |
| 514,907 | 2/1894 | Brush | 310—268 |
| 3,096,455 | 7/1963 | Hahn | 310—268 |
| 3,293,466 | 12/1966 | Henry-Baudot | 310—268 |

DAVID X. SLINEY, *Primary Examiner.*

L. L. SMITH, *Assistant Examiner.*